UNITED STATES PATENT OFFICE.

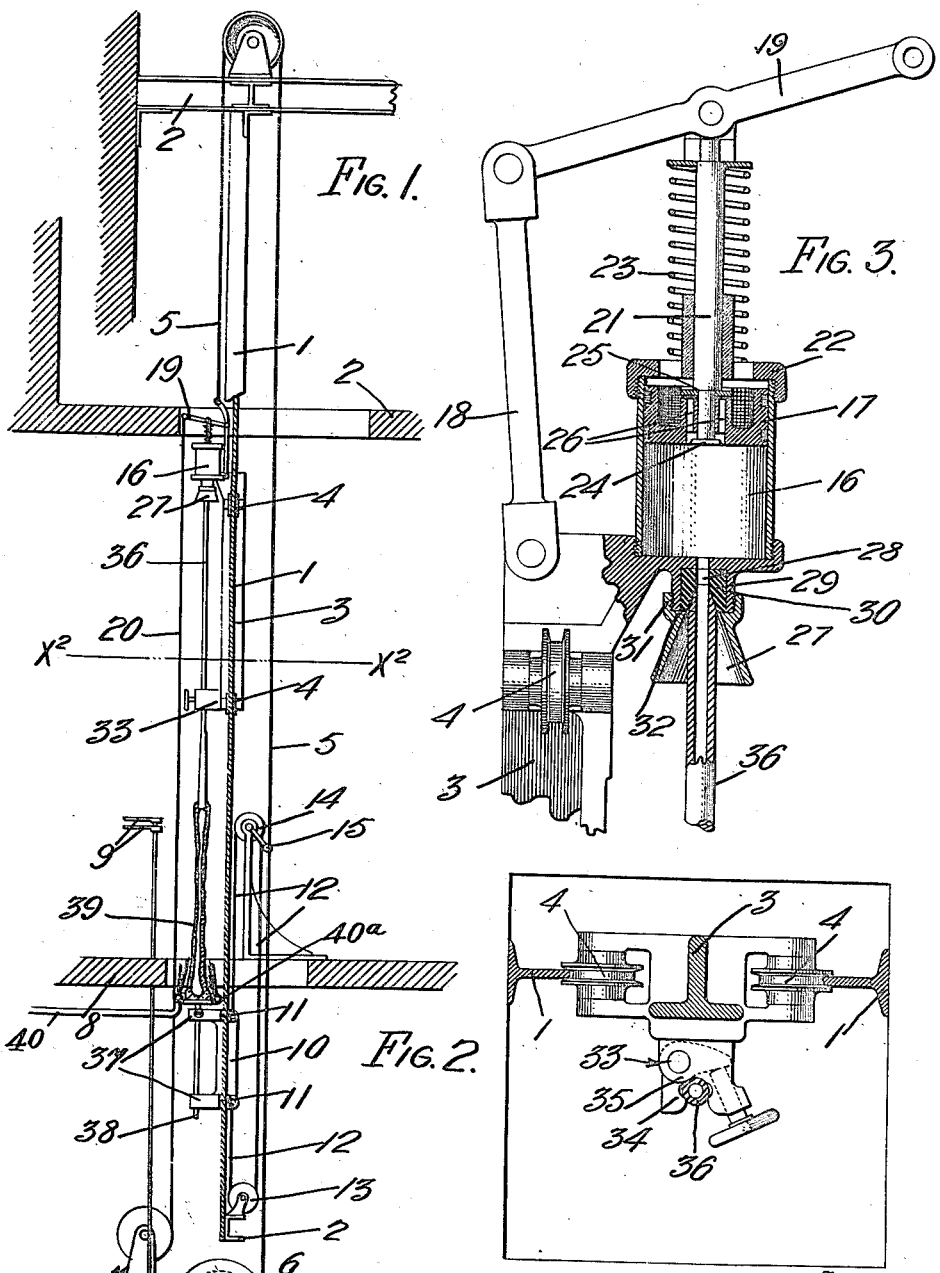

BENJAMIN DAY CHAMBERLIN, OF CORNING, NEW YORK, ASSIGNOR TO CORNING GLASS WORKS, OF CORNING, NEW YORK, A CORPORATION OF NEW YORK.

APPARATUS FOR DRAWING GLASS TUBES.

1,163,969.  Specification of Letters Patent.  Patented Dec. 14, 1915.

Application filed May 13, 1913. Serial No. 767,423.

*To all whom it may concern:*

Be it known that I, BENJAMIN D. CHAMBERLIN, a citizen of the United states, and a resident of Corning, county of Steuben, and State of New York, have invented certain new and useful Improvements in Apparatus for Drawing Glass Tubes, of which the following is a specification.

My invention relates to mechanism to be used in drawing glass tubes, and is especially adapted for carrying out the process described in United States Letters Patent reissued Nov. 22, 1908 to A. A. Houghton, No. 11702, in which process the glass is drawn vertically.

For this purpose, in its perfected form, it consists of a vertical guide way, in which are mounted for vertical movement a carriage adapted to receive a removable bait, and a carriage adapted to receive a removable pipe and of means for lowering the former and of raising the latter. The lowering of the bait serves to position the drawing point of the glass at a point convenient for observation, while the raising of the pipe serves to separate the bait and pipe to draw the glass in the desired manner, and it also comprises means carried by the pipe carriage for controlling the admission of air into glass, to expand the same and thus, in conjunction with the rate of drawing, determine the diameter and bore of the tube produced.

It further consists in the construction, arrangement and combination of the several parts of which it is composed, as will be hereinafter more fully described and claimed.

Referring to the accompanying drawings in which corresponding parts are designated by corresponding marks of reference, Figure 1 is a side elevation of a device embodying my invention. Fig. 2 is a horizontal section on line $X^2$—$X^2$ thereof. Fig. 3 is a fragmental detail partly in section of the pipe carriage.

Between a pair of vertical guide rails 1, 1 suitably supported in a frame 2, is mounted the pipe carriage 3, guided therein by the top and bottom guide rollers 4. The pipe carriage 3 may be raised in the guideway formed by the rails by means of a cable 5, and hoisting drum 6, the latter being driven by a suitable motor 7, which can be controlled in speed and direction from the working platform 8, by means of the operating handles 9.

Mounted between the guide-rails, and guided for movement therein, and below the pipe-carriage, is the bait-carriage 10 having the guide wheels 11, the bait carriage being connected to opposite ends of cable 12, which passes around a pulley 13 at the base of the guide-way and around an operating pulley 14 located adjacent to the working platform and adapted to be turned to raise or lower the bait carriage by the handle 15.

Carried on and projecting from the front of the pipe-carriers at the top thereof is the pump cylinder 16 in which is contained the piston head 17. A link 18 has its lower end pivoted to the carriage and has pivoted to its upper and opposite end one end of a lever 19, to the opposite end of which is attached the cord 20 which depends therefrom and passes through or adjacent to the working platform 8. Intermediate of the ends of the lever is pivoted the upper end of a piston rod 21, the lower end of which passes through a spider 22 on the cylinder and through the piston head, a spiral spring 23 encircling the rod above the spider and tending to throw it up. The piston rod is reduced in diameter at its lower end, and such reduced portion passes through a central aperture in the piston, its upward movement in respect thereto being limited by its upset or enlarged lower end 24, and its downward movement in respect thereto being limited by the shoulder 25 formed at the upper part of such reduced portion, a washer of leather or other suitable material surrounding the reduced portion of the rod between the top of the piston head and the shoulder and when pressed down by the latter sealing the induction ports 26 in the piston head.

The lower end of the pump cylinder has formed therein a downwardly projecting cone 27, the apex of the interior of which communicates with the interior of the base of the cylinder by a passage 28, formed in the bottom of the latter and surrounded by a suitable packing 29. As shown I prefer to place this packing in a recess formed by an annular wall 30, depending from the bottom of the air cylinder, the lower end of which is threaded to receive corresponding threads upon the inside of an annular wall 31 upon the upper end of the cone, which latter has also a shoulder 32 projecting inwardly from its side walls, which shoulder serves as a follower to compress the packing, and to properly seat the pipe in respect to the passage through the packing.

On the lower end of the pipe carriage is mounted a pipe clamp 33, comprising a horizontal web 34 projecting from the front face of the carriage, and having a recess located below the cone, and carrying a pivoted clamping jaw 35, and a screw to actuate the same to press against and hold a blow pipe 36 located in such recess, with its upper end in the passage 28 in the packing 29. Suitable clamps 37 are also located on the forward face of the bait carriage, and are adapted to receive and hold a bait 38.

Attached to the upper end of the bait carriage and encircling the upper end of the bait thereon, is a ring burner 40ª, adapted to be supplied with gaseous fuel through the rubber pipe 40, by which the gather of glass on the bait may be maintained heated during the drawing operation.

For the purpose of taking up slack on the rope 20 as the pipe carriage is lowered, that rope may be wound upon a spring take-up drum 41, located near the bottom of the drawing frame, and provided with a light spring sufficient for the purposes indicated.

In the use of the device before described, a suitable gather of glass 39 having been made upon the end of the pipe 36 and the free end of such gather having been made adherent to a bait in the well known manner, the bait is secured in the clamps 37 provided on the bait carriage, which at this time is lifted to permit this to be accomplished from the working platform, and the blow pipe has its upper end inserted in the cone beneath the air pump, and is clamped therein by the clamp 33 on the pipe carriage. The bait carriage is now lowered by turning the pulley 14 so that its position in respect to the working platform is such as to cause the point of setting of the glass to be in convenient position for observation from the platform, whereupon the motor is set in operation, and the pipe-carriage, and with it the pipe, is lifted, at the rate of speed desired to produce tubing of the desired size, the glass being drawn from the mass on the bait in a gradually reducing stream which, at some point, dependent upon the rate of drawing will become set, that is to say, will cease to flow and the diameter of the stream at this point will determine the diameter of the finished tubing. As the mass of glass cools, the speed of the motor will be increased to increase the rate of drawing, and thus maintain the desired diameter of tubing. Prior to the commencement of the drawing and at such time during the drawing as may be necessary, the workmen by pulling upon the cord 20, depresses the piston head 17 and thus forces a change of air into the glass, to form a cavity therein at the commencement of the operation, and to swell such cavity from time to time as the same may be reduced in the drawing, thus preserving a constant bore to the tube, this being repeated from time to time as may be necessary. Upon the release of the cord, the spring 23 raises the piston rod, which first unseats the washer from the induction ports of the piston head, and then lifts the piston head, to permit air to flow below the same preparatory to the next pumping operation.

Upon the completion of the drawing operation before described, the glass is severed from the bait and the latter removed from the bait-carriage whereupon the pipe carriage is lowered a certain determinate distance at intervals, and at each lowering the tube which was formed in the drawing is severed at a given point on the frame, whereby there results a number of "canes" of tubing each of the same length which is especially desirable in that such tubes are sold when handled on the market in pieces of definite length.

By the mechanism before described, I have found it possible to draw tubes of great length, to utilize a greater portion of the gather than is possible in the present manner of drawing, and to drawing tubes having a greater uniformity of diameter and bore than has heretofore been accomplished. These all result in a greater percentage of finished product in respect to the amount of glass handled upon the blow-pipe than has heretofore been the case.

Having thus described my invention what I claim, and desire to secure by Letters Patent is:—

1. In a device for drawing glass tubes from masses of plastic glass by the reduction in the diameter thereof, the combination with a vertical guide-way, of means for holding a bait for the masses of glass, a carriage for supporting a pipe movable in the guide-way, means for moving the pipe carriage to draw the glass from the bait, an air pump located on the carriage and connected with the pipe thereon, and a piston head, and means under the control of the operator for actuating the piston head.

2. In a device for drawing glass tubes from masses of plastic glass by the reduction in the diameter thereof, the combination with a vertical guide-way, of a working platform adjacent thereto, a bait carriage movable in the guide-way for carrying the masses of glass, means for depressing the bait carriage from the working platform to a position therebelow, a carriage for supporting a pipe, means under the control of the operator on the working platform to lift the pipe carriage at variable speeds to draw the glass from the bait, and means located on the pipe-carriage and under the control of the operator for injecting air at will into the glass through the pipe.

In testimony whereof I hereunto affix my signature in the presence of two witnesses.

BENJAMIN DAY CHAMBERLIN.

Witnesses:
 DELPHINE KEAGLE,
 G. WILLIS DRAKE.